United States Patent [19]
Joe

[11] Patent Number: 5,781,382
[45] Date of Patent: Jul. 14, 1998

[54] ROTARY HEAD DRUM FOR A VCR HAVING AN IMPROVED CONNECTION STRUCTURE BETWEEN A VCR HEAD AND A ROTARY TRANSFORMER

[75] Inventor: Yeo-Uk Joe, Seoul, Rep. of Korea

[73] Assignee: Daewoo Electronics Co., Ltd., Seoul, Rep. of Korea

[21] Appl. No.: 738,865

[22] Filed: Oct. 28, 1996

[30] Foreign Application Priority Data

Oct. 31, 1995 [KR] Rep. of Korea ............... 1995-31872

[51] Int. Cl.[6] ........................................ G11B 5/52
[52] U.S. Cl. ........................................... 360/108
[58] Field of Search ............................ 360/107, 108, 360/130.24, 84

[56] References Cited

U.S. PATENT DOCUMENTS

| 5,299,085 | 3/1994 | Sawai et al. ............... 360/108 |

FOREIGN PATENT DOCUMENTS

| 60-040503 | 3/1985 | Japan ............... 360/108 |
| 60-043204 | 3/1985 | Japan ............... 360/108 |
| 02-009003 | 1/1990 | Japan ............... 360/108 |
| 02-206006 | 8/1990 | Japan ............... 360/108 |
| 02-273301 | 11/1990 | Japan ............... 360/108 |
| 03-230311 | 10/1991 | Japan ............... 360/108 |
| 1525622 | 9/1978 | United Kingdom . |
| 2122018 | 1/1984 | United Kingdom . |

OTHER PUBLICATIONS

Japanese Patent Abstract 60-209902, Moriyama et al., 22 Oct. 1985.

*Primary Examiner*—Craig A. Renner
*Attorney, Agent, or Firm*—Beveridge, DeGrandi, Weilacher & Young LLP

[57] ABSTRACT

Disclosed is a rotary head drum for a VCR having an improved structure for connecting a VCR head to a rotary transformer. A printed circuit board having an electro-conductive pattern is mounted on a head base. The first end of the electro-conductive pattern is electrically connected to a wire of the video head by means of soldering, and an electro-conductive adhesive is provided at the second end of the electro-conductive pattern. The head base is attached to the bottom surface of an upper drum by a screw. After mounting a fixing plate on an upper rotary transformer, a connecting wire extending from the upper rotary transformer is fixed to a bottom surface of a horizontal portion of the fixing plate by soldering. Next, the upper rotary transformer is fixed to the bottom surface of the upper drum. The VCR head does not require a soldering work while the upper rotary transformer is being assembled, thereby improving work efficiency. Since the soldering work is carried out before the assembling process, the number of inferior products which are caused by a soldering fault may be reduced.

12 Claims, 3 Drawing Sheets

ROTARY HEAD DRUM FOR A VCR HAVING AN IMPROVED CONNECTION STRUCTURE BETWEEN A VCR HEAD AND A ROTARY TRANSFORMER

BACKGROUND OF THE INVENTION

1. Field of the Invention

The present invention relates to a rotary head drum for a video cassette recorder (VCR), and more particularly to a rotary head drum for a video cassette having an improved connection structure between a VCR head and a rotary transformer which receives a signal from the VCR head or transfers a signal to the VCR head.

2. Prior Arts

Generally, a VCR is a device for recording an image and/or an audio signal onto a magnetic tape running along a running system or for reproducing signals recorded in the magnetic tape. The magnetic tape is wound on a pair of wheels provided in a cassette, and when the cassette is loaded into a deck of a tape recorder according to a loading mechanism, the pair of wheels are respectively mounted on a take-up reel and a supply reel installed on the deck. After the pair of wheels have been mounted on the take-up reel and the supply reel, tape drawing members draw a tape from the cassette positioned at a loading place so that the tape makes contact with the head drum. At this time, about a half of the circumference of the head drum is covered by the tape. After that, selected running operations such as playing, recording, fast forwarding and rewinding are carried out according to the user's choice. At this time, the magnetic tape is drawn out from one wheel and is wound around the other wheel according to the rotating direction of the take-up reel and the supply reel.

FIG. 1 shows an internal structure of a conventional VCR. Hereinafter, elements for carrying out the above-described VCR deck mechanism will be described in detail with reference to FIG. 1.

In a front portion of an upper surface of a main base 10, a supply reel 12 and a take-up reel 14, which are positioned on a same central line and are driven by a capstan motor after a magnetic tape has been loaded so as to run the magnetic tape in the forward or reverse direction according to the operating mode selected by the user, are installed at a predetermined distance apart from each other. An idler device 16, which is selectively engaged with supply reel 12 and take-up reel 14 according to the driving direction of the capstan motor so as to selectively rotate them, is installed between supply reel 12 and take-up reel 14 on main base 10.

Provided in a rear portion of the upper surface of main base 10 are a drum base 26 which is fixedly installed with a certain inclination, and a head drum 18 which is installed on drum base 26 with the same inclination as drum base 26. Guiding holes 20 and 21 having predetermined shapes are formed on main base 10 on the left side and the right side of head drum 18, that is, between supply reel 12 and head drum 18 and between take-up reel 14 and head drum 18, respectively. At the front portions of guiding holes 20 and 21, a supply side slant pole assembly 22 and a take-up side slant pole assembly 24 are respectively provided. The slant pole assemblies draw the wound tape out when the cassette tape is loaded on supply reel 12 and take-up reel 14, and move along guiding holes 20 and 21 by a separate mechanical mechanism to the rear portion of head drum 18 so that the recording surface of the tape makes contact with circumferences of an upper drum 34 and a lower drum 28, which are elements of head drum 18.

FIG. 2 is a partially cross-sectional view showing in detail the structure of the head drum illustrated in FIG. 1.

Referring to FIG. 2, cylindrical lower drum 28 has a lower rotary transformer 28a therein. A housing 30a having a drum motor 30 therein is installed below lower drum 28. A ring-shaped magnet which forms a rotor 30b is attached to an inner side wall of housing 30a. A stator 30c, which is magnetized when a current is applied thereto, is provided at a center portion of housing 30a. Drum motor 30 is positioned at a bottom center of housing 30a and a bottom of a drum shaft 30d is fixed to drum motor 30. Drum shaft 30d rotates in a predetermined direction as electromagnetic power is generated by the interaction between rotor 30b and stator 30c. Upper drum 34 is positioned above lower drum 28 and is inserted into the upper end portion of drum shaft 30d by applying pressure. A plurality of video heads 32 which are positioned at a predetermined distance apart from each other are disposed below a bottom surface of upper drum 34.

Video heads 32 are fixed to an upper surface of a head base 33. Head base 33 is fixed to upper drum 34 by means of a screw 38. In addition, a printed circuit board 35 having a first end connected to video heads 32 is provided on the bottom surface of head base 33. Printed circuit board 35 has an electro-conductive pattern so as to apply a signal to video head 32 or so as to transfer a signal from video head 32 to other element.

A second end of printed circuit board 35 is connected to a first end of a connecting wire 39. A second end of connecting wire 39 is connected to an upper rotary transformer 34b.

Upper rotary transformer 34b is electrically connected with lower rotary transformer 28a accommodated in lower drum 28 and rotates while supplying image signals from video heads 32 to lower rotary transformer 28a. Upper rotary transformer 34b rotates in a predetermined direction according to the rotation of drum shaft 30d driven by drum motor 30.

Upper rotary transformer 34b is electrically connected to video heads 32 through connecting wire 39 and the electro-conductive pattern of printed circuit board 35. Upper drum 34 transfers the image signal from video head 32 to lower rotary transformer 28a.

The first end of connecting wire 39 is connected to upper rotary transformer 34b and the second end of connecting wire 39 is soldered to the first end of printed circuit board 35.

However, the conventional VCR requires the minimizing the size of upper and lower rotary transformers 34b and 28a in order to provide a working space for soldering connecting wire 39. Further, since the soldering of connecting wire 39 is carried out after mounting upper rotary transformer 34b on upper drum 34, the working space for soldering connecting wire 39 is limited, thereby lowering work efficiency. Accordingly, it requires a great deal of skill to make a good product.

In addition, another method for soldering the video head to the upper rotary transformer has been proposed. In the above method, both end portions of first and second wires, which are respectively connected to the video head and the rotor of the rotary transformer, are soldered on the upper drum. However, this method can be used only when the rotary transformer is large.

On the other hand, U.S. Pat. No. 4.972,283 issued to Soo K. Kim discloses a rotary head in which a flange assembly rotated together with an upper drum is provided on the center portion of the upper drum so that a signal generated from the rotary head is transferred to an upper rotary transformer through the flange assembly. The upper rotary transformer and the flange assembly are connected to each other through a connection wire which is attached to them by a fastening means such as soldering. However, identical to the conventional method described with respect to FIG. 2, this method also requires a sufficient working space for soldering the connection wire.

In addition, U.S. Pat. No. 5,010,432 issued to Hideo Fukushima, et al., discloses a method for connecting an upper rotary transformer to an upper drum by using an L-shaped resilient contactor. However, this method requires a terminal plate for supporting the resilient contactor, so it not only requires many elements, but it also requires assembling steps thereof which are complicated.

SUMMARY OF THE INVENTION

The present invention has been made to solve the problems of the prior arts, and accordingly, it is an object of the present invention to provide a rotary head drum for a VCR having an improved connection structure between a VCR head and a rotary transformer, thereby improving work efficiency during the assembling process and reducing the percentage of inferior products.

To accomplish the above object of the present invention, there is provided a rotary head drum for a video cassette recorder comprising a cylindrical lower drum; a cylindrical upper drum installed on the lower drum and rotatably supported by the lower drum; a video head provided at an outer lower portion of the upper drum for recording or reproducing a video signal from a magnetic tape; a head base for securing the video head to a bottom surface of the upper drum; a printed circuit board attached to a bottom surface of the head base, the printed circuit board having first and second ends, the first end of the printed circuit board being connected to the video head, the printed circuit board including an electro-conductive pattern for receiving or transmitting the video signal from the video head; a lower rotary transformer disposed in an inner upper portion of the lower drum; an upper rotary transformer positioned on the lower rotary transformer for transmitting the video signal applied from the video head to the lower rotary transformer; a connecting wire connected to both the upper rotary transformer and the second end of the printed circuit board in order to transmit the video signal from the printed circuit board to the upper rotary transformer; and a fixing plate for supporting the connecting wire.

According to a preferred embodiment of the present invention, the rotary head drum further comprises a securing member for securely supporting the fixing plate on the upper rotary transformer.

The fixing plate has a reverse-L shape and includes a horizontal portion and a vertical portion. The connecting wire is fixed to the bottom surface of the horizontal portion by means of soldering. Alternatively, the connecting wire can be fixed to the horizontal portion by fitting the connecting wire into the horizontal portion.

The rotary head drum further comprises a means for connecting an upper surface of the horizontal portion to a bottom surface of the printed circuit board. Preferably, the connecting means includes an electro-conductive adhesive. The electro-conductive adhesive is applied to the electro-conductive pattern. In addition, the fixing plate is made of an electro-conductive material such as a metal.

The head drum having the above structure according to one embodiment of the present invention is assembled as follows.

Firstly, the printed circuit board having the electro-conductive pattern is mounted on the head base. The first end of the electro-conductive pattern is electrically connected to the wire of the video heads by means of soldering, and a connecting member made of the electro-conductive adhesive is provided at the second end of the electro-conductive pattern. Then, the head base is attached to the bottom surface of the upper drum by means of a screw.

Next, after mounting the fixing plate made of a metal on the upper rotary transformer by using the securing member, the connecting wire extending from the upper rotary transformer is fixed to the bottom surface of the horizontal portion of the fixing plate by means of soldering. After that, the upper rotary transformer is fixed to the bottom surface of a flange disposed in the upper drum by a fastening means such as an adhesive. Since the connecting member is made of the electro-conductive adhesive, the upper surface of the horizontal portion of the fixing plate can be supported on the bottom surface of the printed circuit board.

The present invention does not require a soldering work while the upper rotary transformer is being assembled, thereby improving work efficiency. In addition, since the soldering work is carried out before the assembling process, the number of inferior products which are caused by a soldering fault may be reduced.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Hereinafter, the constituting elements and the operation principle of the rotary head drum according to the preferred embodiments of the present invention will be explained in detail with reference to the accompanying drawings.

Figure 1:
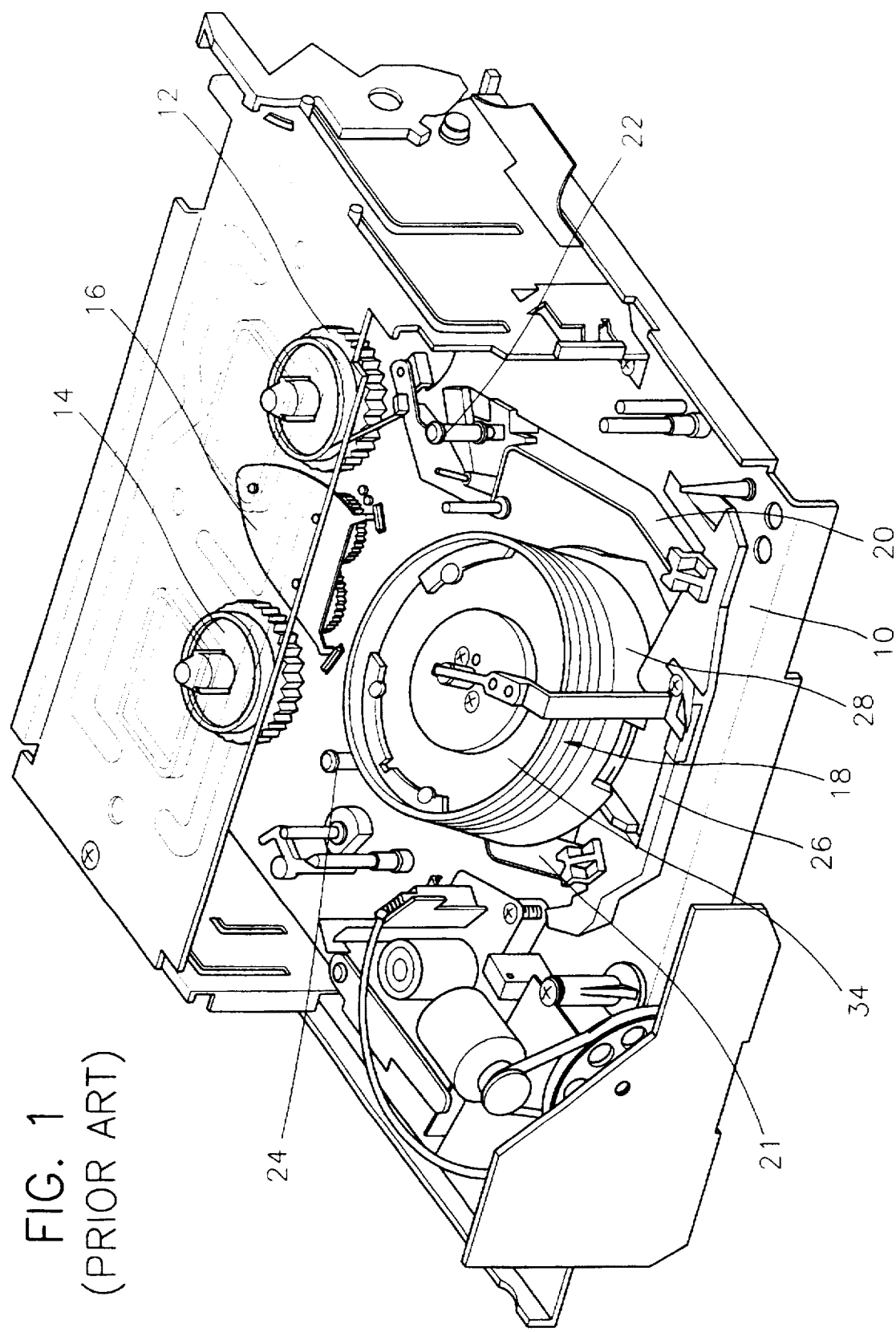
FIG. 1 is a perspective view showing an inner structure of a conventional VCR.
Figure 2:
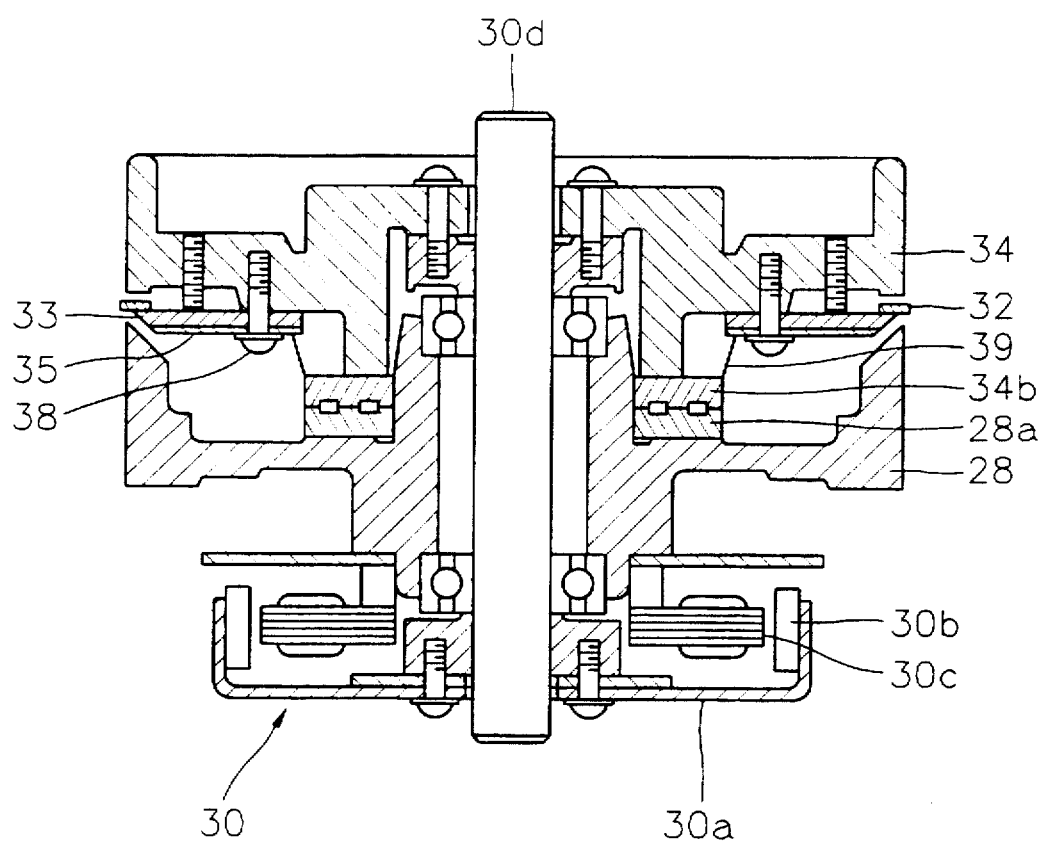
FIG. 2 is a cross-sectional view showing in detail a structure of a rotary head drum shown in FIG. 1.
Figure 3:
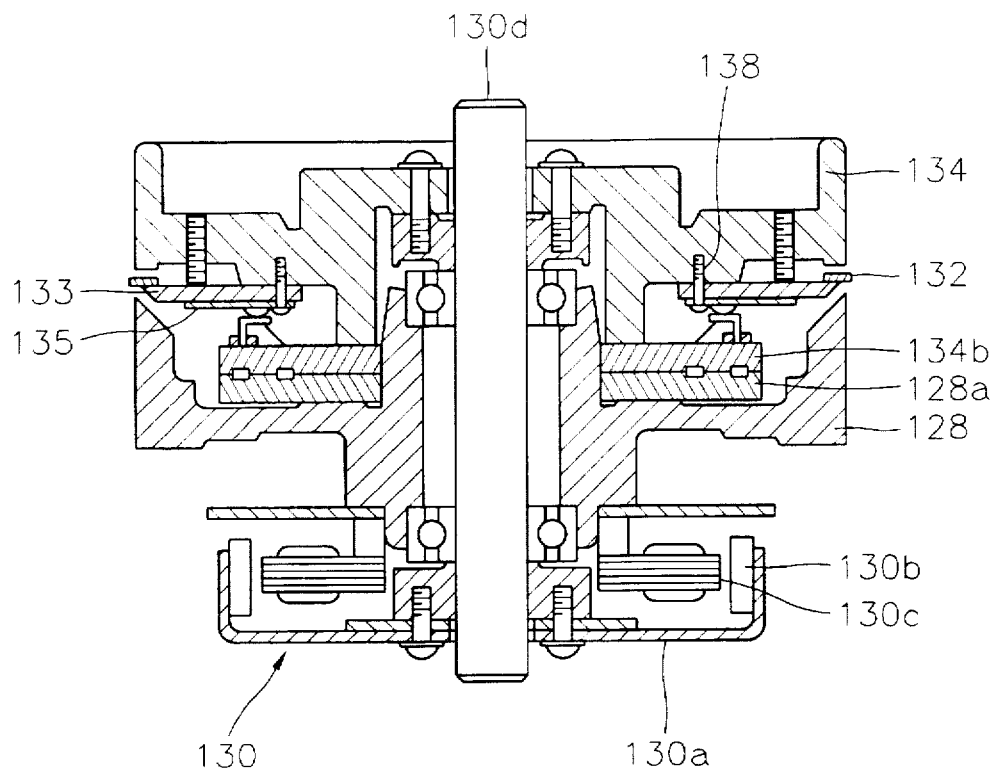
FIG. 3 is a sectional view of a rotary head drum for a VCR according to an embodiment of the present invention.

FIG. 3 is a sectional view of a rotary head drum for a VCR according to one embodiment of the present invention. In a rear portion of an upper surface of a main base 10 having the same structure as the base shown in FIG. 1, a drum base 26 fixedly installed with a certain inclination is positioned at a predetermined distance apart from a supply reel 12. A head drum 118 having the same inclination as drum base 26 is installed on drum base 26.

Referring to FIG. 3, head drum 118 is provided with a cylindrical upper drum 134, a lower drum 128 which is positioned on the same vertical line as upper drum 134 thereby determining the installation position of upper drum 134, and a plurality of video heads 132 which are formed at an end portion of upper drum 134 in such a manner that they are positioned at a predetermined distance apart from each other.

In detail, head drum 118 is provided with lower drum 128 having a lower rotary transformer 128a therein. A housing having a drum motor 130 therein is provided below lower drum 128. A ring-shaped magnet which forms a rotor 130b is attached to an inner side wall of housing 130a. A stator 130c. which is magnetized when a current is applied thereto. is provided at a center portion of housing 130a. Drum motor 130 is positioned at a bottom center of housing 130a, and a bottom of a drum shaft 130d is fixed to drum motor 130. Drum shaft 130d rotates in a predetermined direction as electromagnetic power is generated by an interaction between rotor 130b and stator 130c. Upper drum 134 is positioned above lower drum 128 and is inserted into the upper end portion of drum shaft 130d by applying pressure. Video heads 32. which are positioned at a predetermined distance apart from each other. are disposed below a bottom surface of upper drum 134.

Figure 4:
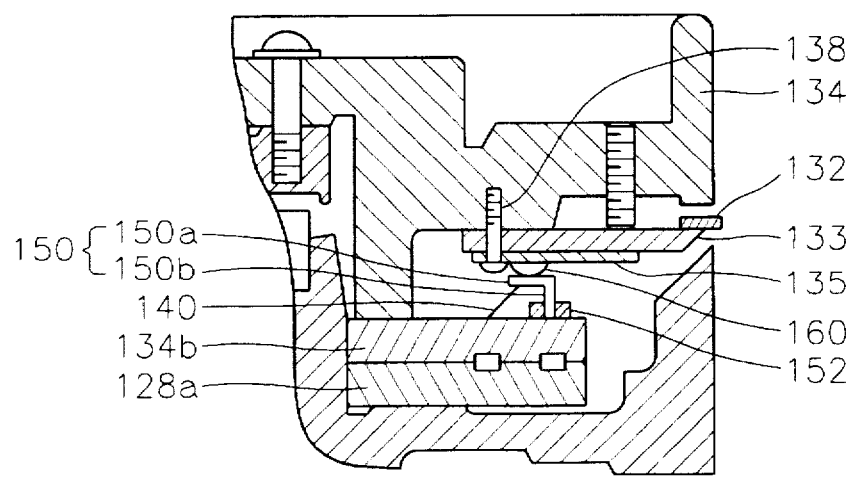
FIG. 4 is an enlarged view showing a connection structure between a VCR head and an upper rotary transformer shown in FIG. 3.

FIG. 4 is an enlarged view showing a connection structure between video heads 132 and an upper rotary transformer 134b shown in FIG. 3. Video heads 132 are fixed to an upper surface of a head base 133. Head base 133 is fixed to upper drum 134 by means of a screw 138. In addition. a printed circuit board 135 is provided on the bottom surface of head base 133. Printed circuit board 135 has an electro-conductive pattern (not shown) so as to apply a signal to video head 132 or so as to transfer a signal from video head 132 to other element. A first end of printed circuit board 135 is connected to a wire (not shown) of video heads 132 by means of soldering. and a second end of printed circuit board 135 is provided at its bottom surface with a connecting member 160 made of an electro-conductive adhesive.

The second end of printed circuit board 135 is electrically connected to a first end of a connecting wire 140. A second end of connecting wire 140 is connected to upper rotary transformer 134b.

Upper rotary transformer 134b is electrically connected to lower rotary transformer 128a accommodated in lower drum 128 and rotates while supplying image signals from video heads 132 to lower rotary transformer 128a. Upper rotary transformer 134b rotates in a predetermined direction according to the rotation of drum shaft 130d driven by drum motor 130.

Upper rotary transformer 134b is electrically connected to video heads 132 through connecting wire 140 and the electro-conductive pattern of printed circuit board 135. Upper drum 134 transfers the image signal from video heads 132 to lower rotary transformer 128a.

The first end of connecting wire 140 is supported by fixing plates 150. Fixing plate 150 has a reverse-L shape and includes a horizontal portion 150a for fixing connecting wire 140 and a vertical portion 150b for supporting horizontal portion 150a. Connecting wire 140 is fixed to a bottom surface of horizontal portion 150a by means of soldering or fitting. The number of fixing plates 150 are the same as the number of video heads 132.

A securing member 152 for securely supporting fixing plate 150 is provided at a lower portion of vertical portion 150b.

Connecting member 160 is provided between horizontal portion 150a and the bottom surface of printed circuit board 135 so as to connect them to each other. As mentioned above, connecting member 160 is made of an electro-conductive adhesive. Preferably, connecting member 160 is firstly applied to one end of the electro-conductive pattern of printed circuit board 135, and then is adhered to horizontal portion 150a during the assembling process. By using connecting member 160 made of an electro-conductive adhesive, the upper surface of horizontal portion 150a is electrically communicated with the bottom surface of printed circuit board 135.

Fixing plate 150 can be manufactured by using various materials, so long as they can provide electrical-communication between connecting wire 140 and the electro-conductive pattern of printed circuit board 135. Preferably. fixing plate 150 is made of an electro-conductive metal.

Head drum 118 having the above structure according to one embodiment of the present invention is assembled as follows.

Firstly, printed circuit board 135 having an electro-conductive pattern is mounted on head base 133. The first end of the electro-conductive pattern is electrically connected to the wire of video heads 132 by soldering, and connecting member 160 made of the electro-conductive adhesive is provided at the second end of the electro-conductive pattern. Then, head base 133 is attached to the bottom surface of upper drum 134 by means of screw 138.

Next. after mounting the fixing plate made of a metal on upper rotary transformer 134b by using securing member 152, connecting wire 140 extended from upper rotary transformer 134b is fixed to the bottom surface of horizontal portion 150a of fixing plate 150 by means of soldering. After that, upper rotary transformer 134b is fixed to the bottom surface of upper drum 134 by a fastening means such as an adhesive. As a result, the upper surface of horizontal portion 150a of fixing plate 150 makes contact with connecting member 160. Accordingly. the signal can be transferred to upper rotary transformer 134b from video heads 132. At this time, since connecting member 160 is made of an electro-conductive adhesive, the upper surface of horizontal portion 150a of fixing plate 150 can be supported on the bottom surface of printed circuit board 135.

According to the present invention, the reverse-L shaped fixing plate is installed on the upper rotary transformer and the electro-conductive adhesive is applied to the electro-conductive pattern of the printed circuit board after the wire extending from the upper rotary transformer is fixed to the fixing plate. As a result, the upper surface of the horizontal portion of the fixing plate makes contact with the electro-conductive adhesive so that the video heads may be electrically connected to the upper rotary transformer. Accordingly. the present invention does not require a soldering work while the upper rotary transformer is being assembled, thereby improving work efficiency. In addition, since the soldering work is carried out before the assembling process, the number of inferior products which are caused by a soldering fault may be reduced and the manufacturing cost thereof may be reduced.

Although the preferred embodiment of the invention has been described, it will be understood by those skilled in the art that the present invention should not be limited to the described preferred embodiment, but various changes and modifications can be made within the spirit and scope of the invention as defined by the appended claims.

What is claimed is:

1. A rotary head drum for a video cassette recorder comprising:

a cylindrical lower drum;

a cylindrical upper drum installed on the lower drum and rotatably supported by the lower drum;

a video head provided at an outer lower portion of the upper drum for recording or reproducing a video signal to or from a magnetic tape;

a head base for securing the video head to a bottom surface of the upper drum;

a printed circuit board attached to a bottom surface of the head base, the printed circuit board having first and second ends, the first end of the printed circuit board being connected to the video head, the printed circuit board including an electro-conductive pattern for receiving or transmitting the video signal from or to the video head;

a lower rotary transformer disposed in an inner upper portion of the lower drum;

an upper rotary transformer positioned over the lower rotary transformer for transmitting the video signal from the video head to the lower rotary transformer;

a connecting wire electrically connected to both the upper rotary transformer and the second end of the printed circuit board in order to transmit the video signal from the printed circuit board to the upper rotary transformer; and a fixing plate supporting the connecting wire, the fixing plate having a reverse-L shape and including a horizontal portion and a vertical portion, the connecting wire extending from the upper rotary transformer and being fixed to a bottom surface of the horizontal portion.

2. A rotary head drum for a video cassette recorder as claimed in claim 1, further comprising a securing member for securely supporting the fixing plate, the securing member being disposed on the upper rotary transformer.

3. A rotary head drum for a video cassette recorder as claimed in claim 1, wherein the fixing plate is made of an electro-conductive material.

4. A rotary head drum for a video cassette recorder as claimed in claim 1, wherein the connecting wire is fixed to the bottom surface of the horizontal portion by means of a soldering.

5. A rotary head drum for a video cassette recorder as claimed in claim 1, wherein the connecting wire is fixed to the horizontal portion by fitting the connecting wire into the horizontal portion.

6. A rotary head drum for a video cassette recorder as claimed in claim 1, further comprising a means for connecting an upper surface of the horizontal portion to a bottom surface of the printed circuit board.

7. A rotary head drum for a video cassette recorder as claimed in claim 6, wherein the connecting means includes an electro-conductive adhesive.

8. A rotary head drum for a video cassette recorder as claimed in claim 7, wherein the electro-conductive adhesive is applied to the electro-conductive pattern.

9. A rotary head drum for a video cassette recorder comprising:

a cylindrical lower drum;

a cylindrical upper drum installed on the lower drum and rotatably supported by the lower drum;

a video head provided at an outer lower portion of the upper drum for recording or reproducing a video signal to or from a magnetic tape;

a head base for securing the video head to a bottom surface of the upper drum;

a printed circuit board attached to a bottom surface of the head base, the printed circuit board having first and second ends, the first end of the printed circuit board being connected to the video head, the printed circuit board including an electro-conductive pattern for receiving or transmitting the video signal from or to the video head;

a lower rotary transformer disposed in an inner upper portion of the lower drum;

an upper rotary transformer positioned over the lower rotary transformer for transmitting the video signal from the video head to the lower rotary transformer;

a connecting wire electrically connected to both the upper rotary transformer and the second end of the printed circuit board in order to transmit the video signal from the printed circuit board to the upper rotary transformer;

a fixing plate supporting the connecting wire, the fixing plate having a reverse-L shape and including a horizontal portion and a vertical portion, the connecting wire extending from the upper rotary transformer and being fixed to a bottom surface of the horizontal portion, said fixing plate being comprised of an electro-conductive material;

a securing member for securely supporting the fixing plate, the securing member being disposed on the upper rotary transformer; and a means for connecting an upper surface of the horizontal portion to a bottom surface of the printed circuit board, said connecting means being comprised of an electro-conductive adhesive.

10. A rotary head drum for a video cassette recorder as claimed in claim 9, wherein the electro-conductive adhesive is applied to the electro-conductive pattern.

11. A rotary head drum for a video cassette recorder as claimed in claim 9, wherein the connecting wire is fixed to the bottom surface of the horizontal portion by means of a soldering.

12. A rotary head drum for a video cassette recorder ;as claimed in claim 9, wherein the connecting wire is fixed to the horizontal portion by fitting the connecting wire into the horizontal portion.

* * * * *